(No Model.)

B. LENSING.
WEIGHING ATTACHMENT TO CARTS.

No. 266,846. Patented Oct. 31, 1882.

WITNESSES
Fred. G. Dieterich
F. A. Schmidt

Bernard Lensing
INVENTOR,
by Louis Bagger & Co.
Attorneys

UNITED STATES PATENT OFFICE.

BERNARD LENSING, OF EVANSVILLE, INDIANA.

WEIGHING ATTACHMENT TO CARTS.

SPECIFICATION forming part of Letters Patent No. 266,846, dated October 31, 1882.

Application filed July 25, 1882. (No model.)

*To all whom it may concern:*

Be it known that I, BERNARD LENSING, of Evansville, in the county of Vanderburg and State of Indiana, have invented certain new and useful Improvements in Weighing Attachments; and I do hereby declare that the following is a full, clear, and exact description of the invention, which will enable others skilled in the art to which it appertains to make and use the same, reference being had to the accompanying drawings, which form a part of this specification, and in which—

Figure 1:
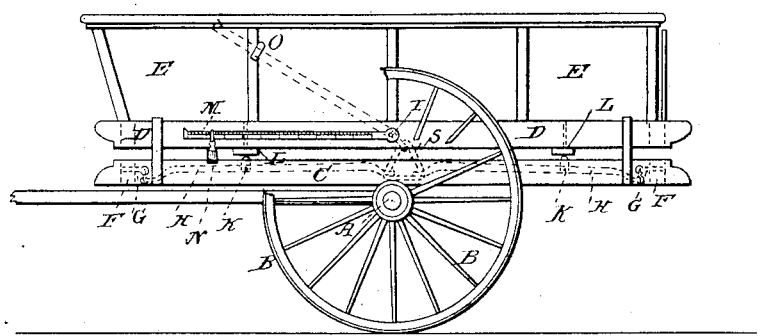
Figure 2:
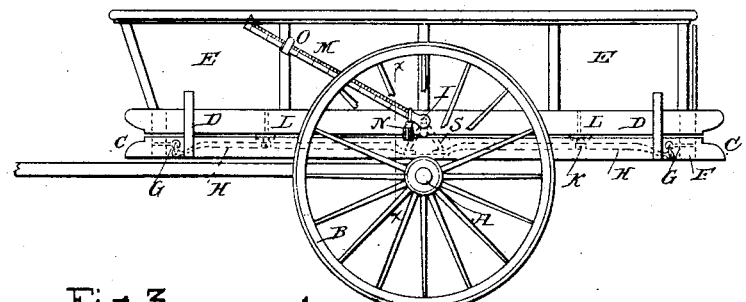
Figure 3:
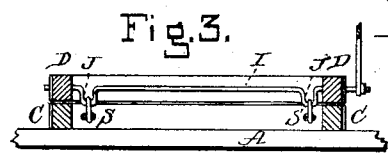
Figure 4:
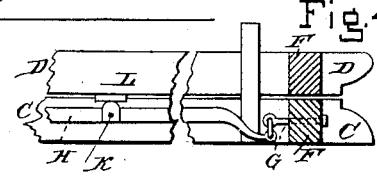

Figure 1 is a side view showing the cart-body raised in the act of weighing. Fig. 2 is a side view showing the cart-body lowered or adjusted for transportation. Fig. 3 is a sectional view on the line *x x*, and Fig. 4 is a detail view on an enlarged scale.

Corresponding parts in the several figures are denoted by like letters of reference.

This invention relates to an improved weighing attachment to dumping-carts and other vehicles; and it consists in certain improvements in the construction of the same, which will be hereinafter fully described, and particularly pointed out in the claim.

In the drawings hereto annexed, A represents the axle, and B B the wheels, of an ordinary dumping-cart.

C is the bed-frame, which is secured to the axle in the usual manner, and D is an auxiliary frame which supports the cart-body E, the latter being bolted or otherwise firmly secured to said frame. The end beams, F, of the bed-frame C have eyebolts or staples G, to which the outer ends of levers, H, are connected by means of links, bolts, or in any other suitable manner.

In suitable bearings centrally in the sides of the upper frame, D, is journaled a transverse shaft, I, having U-shaped cranks J projecting downwardly, as shown, and carrying triangular links S to afford fastenings or bearings for the inner ends of the levers, H, which are connected to the lower corners of said links. At equidistant points from their inner ends the levers H are provided with hardened—such as steel or chilled iron—bearing studs or points K, working against chafe or bearing plates L, secured at corresponding points upon the under side of frame D.

To one of the outer ends of shaft I is firmly secured a properly-graduated scale-beam or steelyard, M, upon which a weight, N, is adjustable in the usual manner. While not in use the said beam may be supported in a hook, O, upon the side of the cart-body. When it is desired to weigh the contents of the cart the beam is released from hook O, and the weight adjusted until it balances the cart-body, as shown in Fig. 1 of the drawings.

This improved weighing device is simple, convenient, inexpensive, and accurate, and may be readily attached or adapted to various classes and descriptions of vehicles.

Having thus described my invention, I claim and desire to secure by Letters Patent of the United States—

The combination of the axle A, frame C, frame D, having wagon-body E and crank-shaft I, links S, and levers H, having bearing-studs K, and the scale-beam or steelyard M, all constructed, arranged, and operating as herein described, for the purpose shown and specified.

In testimony that I claim the foregoing as my own I have hereunto affixed my signature in presence of two witnesses.

BERNARD LENSING.

Witnesses;
JOHN GAISTO,
J. E. WILLIAMSON,
AUGUST BRAND.